United States Patent Office 3,379,777
Patented Apr. 23, 1968

3,379,777
ACETYLENIC CARBINOLS
Roman Marbet, Riehen, Switzerland, assignor to Hoffmann-La Roche Inc., Nutley, N.J., a corporation of New Jersey
No Drawing. Filed Mar. 4, 1965, Ser. No. 437,300
Claims priority, application Switzerland, Apr. 2, 1964, 4,159/64
7 Claims. (Cl. 260—632)

ABSTRACT OF THE DISCLOSURE

Acetylenic carbinols having the formula $$R-H_2C-Z-CH_2-CH_2-\underset{\underset{CH_3}{|}}{CH}-CH_2-\underset{\underset{OH-C\equiv CH}{|}}{CH}$$

in which the symbol R represents hydrogen or a lower alkyl group; and in which the symbol Z represents $$-\underset{\underset{CH_3}{|}}{CH}-\underset{\underset{R}{|}}{CH}-$$

and $$-\underset{\underset{CH_3}{|}}{C}=\underset{\underset{R}{|}}{C}-$$

the symbol R representing hydrogen or a lower alkyl group, are described.

The acetylenic carbinols are characterized by their fine fragrance and are used in the production of perfumes and other scented compositions.

---

This invention relates, in general, to a new class of compounds and to a process for producing same. More particularly, the invention relates to novel acetylene carbinols and a method for the manufacture thereof.

The compounds which are prepared in the practice of this invention have the formula $$R-H_2C-Z-CH_2-CH_2-\underset{\underset{CH_3}{|}}{CH}-CH_2-\underset{\underset{OH}{|}}{CH}-C\equiv CH \qquad I$$

in which the symbol R represents a member selected from the group consisting of hydrogen and a lower alkyl group, particularly, an alkyl group having from 1 to 6 carbon atoms, such as, methyl, ethyl, propyl, isopropyl, butyl, pentyl, hexyl, etc.; and in which Z is a member selected from the group consisting of $$-\underset{\underset{CH_3}{|}}{CH}-\underset{\underset{R}{|}}{CH}-$$

and $$-\underset{\underset{CH_3}{|}}{C}=\underset{\underset{R}{|}}{C}-$$

in which R has the same meaning as aforesaid.

The acetylene carbinols of Formula I are characterized, especially, by their fine fragrance. They are, accordingly, useful and used as odorants in the production of perfumes and other scented compositions.

The compounds of Formula I are readily prepared. In a preferred preparative method, an aldehyde having the formula $$R-H_2C-Z-CH_2-CH_2-\underset{\underset{CH_3}{|}}{CH}-CH_2-CHO \qquad II$$

in which the symbols R and Z have the same meaning as in Formula I, is ethynylated. In general, ethynylation of the aldehyde of Formula II is carried out, using techniques known per se, by reacting the aldehyde with acetylene or with an acetylide. The condensation of the Formula II aldehyde with acetylene or with an acetylide compound is effected, conveniently, in the presence of a solvent. Liquid ammonia has been found to be particularly well suited for use as the solvent for the reaction. If desired, however, other compounds, such as, ethers, acetals and amines can be used as solvents in the reaction. Furthermore, the condensation of the aldehyde of Formula II with either acetylene or an acetylide compound is carried out in the presence of a suitable condensation agent. As the condensation agent, there can be used, for example, an alkali metal or an alkaline earth metal, such as, lithium, sodium, calcium, potassium, etc., as well as their amides, acetylides, hydrides, alcoholates or hydroxides. In the alternative, ion-exchange resins can be used in the ethynylation reaction as condensing agents. The quantity of condensation agent which is employed in the reaction is not particularly critical. Thus, for example, the condensation agent can be incorporated into the reaction system in a stoichiometrically equivalent quantity or it can be added in catalytic quantities. Furthermore, the ethynylation process can be carried out under pressure, for example, at a pressure of up to about 30 atmospheres. However, it is preferred to effect the reaction under pressure in those embodiments of the invention in which a catalytic amount of condensation agent is employed.

In an alternate process, the ethynylation can be carried out by the reaction of the Formula II aldehyde with an acetylene Grignard compound, such as, acetylene magnesium bromide.

In one particular embodiment of this invention, there is used as the starting material, crude citronellal-containing essential oils, such as, citronella oil. These oils have a well known, somewhat unpleasant penetrating odor with an accompanying rancid fatty side note which, in time, becomes especially unpleasant. Ethynylation thereof produces oils having a fresh rose-like odor which is particularly distinguished by its excellent lasting properties.

As pointed out heretofore, the compounds of this invention possess an exceedingly pleasant, flower-fruitlike fragrance. Moreover, the fragrance is long-lasting. By virtue of such properties the present compounds are useful and used as odorants in the preparation of perfumes and other perfume products. Furthermore, the compounds are especially well suited for use as fixatives and base-odorants.

For a fuller understanding of the nature the objects of this invention, reference may be had to the following examples which are given merely as illustrations and are not to be construed in a limiting sense.

Example 1

(a) In this example, 2 liters of liquid ammonia were charged into a four liter flask. To the liquid ammona there was added 80 grams of potassium under an atmosphere of nitrogen gas. A small quantity of ferric nitrate was then added and the mixture was stirred for about two hours until the deep blue color of the solution changed into grey. Acetone-free, dry acetylene was, thereafter, fed into the mixture for one hour at the rate of 3 liters per minute, following which a solution of 308 grams of citronellal (2 moles) in 400 ml. of ether was added over a period of about thirty minutes. Acetylene is fed in the reaction mixture for an additional four hours at the reduced rate of about 1 liter per minute. The mixture was then neutralized, by the portionwise addition of 200 grams of ammonium chloride. The mixture was subsequently filtered by suction. After thorough re-washing, the ether solution was shaken once with 10% sulfuric acid, dried over sodium bicarbonate and evaporated. As the residue there remained a pleasant smelling oil which oil was further purified by distillation. There was, thus obtained, 3-hydroxy-5,9-dimethyl-8-decen-1-yne having a boiling point of 66° to 67° C./0.1 mm.; $n_D^{20}=1.4744$. The so-obtained 3-hydroxy-5,9-dimethyl-8-decen-1-yne had a fresh, fine fruit-like odor resembling lemons and bergamotte with a flowery-green note resembling lilies of the valley. A long-lasting roselike after-odor was also observed.

(b) The compound, the production of which is described in the preceding paragraph, was prepared also by the ethynylation of citronellal with sodium in liquid ammonia in the following manner: 2 liters of liquid ammonia was added to 46 grams of sodium and acetylene was fed in the solution until the solution was colorless. After acetylene has been fed in for an additional hour, 308 grams of citronellal in 400 ml. of ether were added and the product was worked up in the manner described in paragraph (a) of this example to pure 3-hydroxy-5,9-dimethyl-8-decen-1-yne.

(c) The ethynylation of citronellal was also carried out under pressure as follows: 46 grams of sodium were added to 1.2 liters of liquid ammonia in a pressure vessel, with ice-cooling at a temperature of about 5° C. The resulting pressure was about 5 atmospheres. Acetylene was then fed into the vessel with stirring at a temperature of about 5° C. until a total pressure of 9 atmospheres was reached. After about fifteen minutes, the ammonia solution had become colorless. Thereafter, 308 grams of citronellal, in 300 ml. of ether, were pumped into the pressure vessel. Acetylene was allowed to react for an additional thirty minutes, following which the reaction mixture was worked up with ammonium chloride in the manner described in paragraph (a) of this example. On distillation there was obtained the desired 3-hydroxy-5,9-dimethyl-8-decen-1-yne.

(d) The ethynylation of citronellal was also carried out using an acetylene Grignard compound in the following manner: 24 grams of magnesium were added to 700 ml. of tetrahydrofuran and 109 grams of ethyl bromide at a temperature within the range of from about 20° to 40° C. After stirring for two hours, the thus obtained ethyl magnesium bromide solution was allowed to drop, over a period of about thirty minutes, into 400 ml. of tetrahydrofuran which had been saturated previously with acetone-free acetylene gas. Acetylene was fed into the mixture for a period of one hour at the rate of 3 liters per minute. The mixture was then admixed at 20° to 30° C. with 77 grams of citronellal (0.5 mole) in 77 ml. of tetrahydrofuran. The mixture was stirred for a period of about five hours, following which the product was poured on a mixture of ice and 70 ml. of glacial acetic. The acetylene carbinol which separated was then extracted with ether. After working up and distillation, as described in paragraph (a) of this example, pure 3-hydroxy-5,9-dimethyl-8-decen-1-yne was obtained.

Example 2

In this example, 20 grams of potassium were dissolved in 500 ml. of liquid ammonia with the addition of a trace of ferric nitrate. Acetone-free acetylene was then fed into the mixture and 84 grams of 3,7-dimethyl-6-nonen-1-al in 100 ml. of diethyl ether were added. After working up with 50 grams of ammonium chloride and distillation in the manner described in Example 1(a), 3-hydroxy-5,9-dimethyl-8-undecen-1-yne was obtained as a colorless oil. The compound, boiling at 76° to 77° C./0.07 mm.; $n_D^{20}=1.4694$, had fruitlike-fatty, somewhat flowery, i.e., rose-like odor, of good lasting quality.

The aldehyde used as starting material was produced by partial, catalytic hydrogenation of 3,7-dimethyl-2,6-nonadien-1-al.

Example 3

In this example, 20 grams of potassium in 500 ml. of liquid ammonia was treated with acetylene gas and 84 grams of 3,6,7-trimethyl-6-octen-1-al in 100 ml. of diethyl ether was added to the mixture. After working up, as described in Example 1, pure 3-hydroxy-5,8,9-trimethyl-8-decen-1-yne was obtained as a colorless oil, boiling at B.P=83° C./0.1 mm.; $n_D^{20}=1.4744$. The compound had a fine, fresh and delicate flowerlike odor, reminiscent of roses and lilies of the valley, with a fruitlike side-note and good adhesion.

The aldehyde used as starting material was manufactured by partial, catalytic hydrogenation of 3,6,7-trimethyl-2,6-octadien-1-al (ε-methyl-citral).

Example 4

In this example, 102 grams of 3,7-dimethyloctanal (dihydrocitronella) were allowed to drop into a solution of 26 grams of potassium in 650 grams of liquid ammonia which had been treated with acetylene. The reaction mixture was worked up in the manner described in Example 1(a) and there was obtained 3-hydroxy-5,9-dimethyl-1-decyne which, after fractional distillation, had a boiling point of 72° C./0.1 mm.; $n_D^{20}=1.4488$. The compound had a fruitlike (like gooseberries), slightly flowery, harsh-fatty odor and it exhibited good adhesion.

The dihydro-citronellal used as starting material was produced by the catalytic hydrogenation of citronellal.

Example 5

In this example, 80 grams of potassium were dissolved, with stirring, in 2 liters of liquid ammonia at a temperature of about −30° C. A trace amount of ferric nitrate had been previously added to the liquid ammonia. The blue color of the reaction mixture disappeared in a period of about twenty minutes and, at that time, a stream of acetylene gas was fed into the reaction mixture for a period of about one hour. Thereafter, the reaction mixture was mixed with a solution of 300 grams of dry citronella oil in 300 ml. of diethyl ether. The mixture was heated for about 2 hours at the boiling point of liquid ammonia and, subsequently, 200 grams of ammonium chloride was added thereto. After the reaction mixture was worked up as described in Example 1(a), there was obtained 300 grams of a brown-yellow oil which had a pleasant, fresh, roselike odor with a herblike side note and good adhesion characteristics.

I claim:
1. An acetylene carbinol having the formula

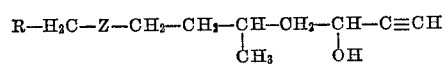

in which R is a member selected from the group consisting of hydrogen and lower alkyl and in which Z is a member selected from the group consisting of

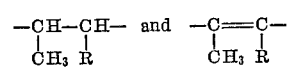

R being a member selected from the group consisting of hydrogen and lower alkyl.

2. An acetylene carbinol having the formula

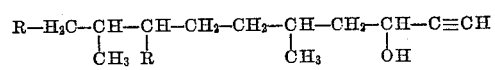

in which R is a member selected from the group consisting of hydrogen and lower alkyl.

3. An acetylene carbinol having the formula $$R-H_2C-C=C-CH_2-CH_2-CH-CH_2-CH-C\equiv CH$$
$$\qquad\;\;|\quad\;\;|\qquad\qquad\quad\;|\qquad\quad\;|$$
$$\qquad\;CH_3\;R\qquad\qquad\qquad CH_3\qquad OH$$

in which R is a member selected from the group consisting of hydrogen and lower alkyl.
4. 3-hydroxy-5,9-dimethyl-8-decen-1-yne.
5. 3-hydroxy-5,9-dimethyl-8-undecen-1-yne.
6. 3-hydroxy-5,8,9-trimethyl-8-decen-1-yne.
7. 3-hydroxy-5,9-dimethyl-1-decyne.

References Cited
UNITED STATES PATENTS

| | | | |
|---|---|---|---|
| 2,125,384 | 8/1938 | Macullum | 260—631.5 |
| 2,904,593 | 9/1959 | Robeson et al. | 260—638 |
| 2,918,412 | 12/1959 | Wood et al. | 260—638 |

FOREIGN PATENTS 890,603   3/1962   Great Britain.

OTHER REFERENCES

Simonsen: "The Terpenes," vol. I, 2nd ed. (1947), pp. 69 to 79.

BERNARD HELFIN, *Acting Primary Examiner.*

LEON ZITVER, *Examiner.*

J. E. EVANS, *Assistant Examiner.*

UNITED STATES PATENT OFFICE
CERTIFICATE OF CORRECTION

Patent No. 3,379,777                          April 23, 1968

Roman Marbet

It is certified that error appears in the above identified patent and that said Letters Patent are hereby corrected as shown below:

Column 1, lines 15 and 16, the formula should appear as shown below:

same column 1, line 36, after "and" insert -- to --. Column 2, line 52, "the" should read -- and --; line 59, "ammona" should read -- ammonia --. Column 4, line 15, "reminescent" should read -- reminiscent --.

Signed and sealed this 24th day of February 1970.

(SEAL)
Attest:

EDWARD M. FLETCHER, JR.                  WILLIAM E. SCHUYLER, JR.
Attesting Officer                           Commissioner of Patents